(12) United States Patent
Chuang et al.

(10) Patent No.: US 12,206,793 B2
(45) Date of Patent: Jan. 21, 2025

(54) SIGNATURE VERIFICATION METHOD, MEMORY STORAGE DEVICE AND MEMORY CONTROL CIRCUIT UNIT

(71) Applicant: PHISON ELECTRONICS CORP., Miaoli (TW)

(72) Inventors: Aaron C Chuang, Taipei (TW); Meng-Chang Chen, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 423 days.

(21) Appl. No.: 17/878,084

(22) Filed: Aug. 1, 2022

(65) Prior Publication Data

US 2024/0031165 A1    Jan. 25, 2024

(30) Foreign Application Priority Data

Jul. 19, 2022    (TW) .................................. 111127009

(51) Int. Cl.
*H04L 9/32* (2006.01)
*G06F 3/06* (2006.01)

(52) U.S. Cl.
CPC .......... *H04L 9/3247* (2013.01); *G06F 3/0604* (2013.01); *G06F 3/0655* (2013.01); *G06F 3/0679* (2013.01)

(58) Field of Classification Search
CPC ................................................... H04L 9/3247
See application file for complete search history.

(56) References Cited

U.S. PATENT DOCUMENTS

| 5,643,086 A * | 7/1997 | Alcorn ..................... G06F 21/57 463/16 |
| 2002/0007456 A1* | 1/2002 | Peinado ................ H04L 9/0897 713/164 |
| 2002/0016913 A1* | 2/2002 | Wheeler ............... H04L 9/3247 713/181 |
| 2002/0026583 A1* | 2/2002 | Harrison ............... H04L 9/3236 713/172 |
| 2017/0201378 A1* | 7/2017 | Kim ........................ G06F 21/73 |
| 2021/0209219 A1* | 7/2021 | Park ...................... H04L 9/3247 |

(Continued)

FOREIGN PATENT DOCUMENTS

TW    I496161    8/2015

OTHER PUBLICATIONS

"Office Action of Taiwan Counterpart Application", issued on Apr. 24, 2023, p. 1-p. 7.

*Primary Examiner* — Ponnoreay Pich
(74) *Attorney, Agent, or Firm* — JCIPRNET (57) ABSTRACT

A signature verification method, a memory storage device, and a memory control circuit unit are disclosed. The method includes: reading first data, signature information, and first verification information from a memory storage device; performing a first verification operation according to the signature information and the first verification information; generating second verification information according to the first data; performing a second verification operation according to the first verification information and the second verification information; and performing a corresponding process on the first data according to an operation result of the first verification operation and an operation result of the second verification operation.

24 Claims, 7 Drawing Sheets

(56) References Cited

U.S. PATENT DOCUMENTS

2021/0303458 A1* 9/2021 Li ................ G06F 21/602
2021/0328767 A1* 10/2021 Wei ............... H04L 9/0869
2024/0031165 A1* 1/2024 Chuang ........... G06F 3/0655

* cited by examiner

SIGNATURE VERIFICATION METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 111127009, filed on Jul. 19, 2022. The entirety of the above-mentioned patent application is hereby incorporated by reference herein and made a part of this specification.

BACKGROUND OF THE INVENTION

Field of the Invention

The invention relates to a signature verification technique for a memory, and more particularly, to a signature verification method, a memory storage device, and a memory control circuit unit.

Description of Related Art

Portable electronic devices such as mobile phones and notebook computers have grown rapidly in the past few years, which has led to a rapid increase in consumer demand for storage media. Since a rewritable non-volatile memory module (such as a flash memory) has characteristics such as data non-volatility, power-saving, small size, and lack of mechanical structures, the rewritable non-volatile memory module is very suitable to be built into the various portable electronic devices provided above.

Traditionally, data and corresponding signature information are stored in a memory module. During data and signature verification, the data and corresponding signature information are read from the memory module. The read data is first used to calculate the verification information. Then, the read signature information and the calculated verification information are sent to the signature verification module for verification. If verified, the data and the corresponding signature information are correct. Otherwise, the data and/or signature information may have been forged or altered. However, as mentioned above, the traditional data and signature verification process need to wait until the verification information is calculated in real time before the signature verification module may continue to perform signature verification, resulting in low signature verification efficiency.

SUMMARY OF THE INVENTION

Accordingly, the invention provides a signature verification method, a memory storage device, and a memory control circuit unit that may alleviate the above issues and/or improve the verification efficiency of a signature.

An exemplary embodiment of the invention provides a signature verification method, configured for a rewritable non-volatile memory module, the signature verification method including: reading first data, signature information, and first verification information from a memory storage device; performing a first verification operation according to the signature information and the first verification information; generating second verification information according to the first data; performing a second verification operation according to the first verification information and the second verification information; and performing a corresponding process on the first data according to an operation result of the first verification operation and an operation result of the second verification operation.

An exemplary embodiment of the invention further provides a memory storage device including a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The memory control circuit unit is configured to: read first data, signature information, and first verification information from the rewritable non-volatile memory module; perform a first verification operation according to the signature information and the first verification information; generate second verification information according to the first data; perform a second verification operation according to the first verification information and the second verification information; and perform a corresponding process on the first data according to an operation result of the first verification operation and an operation result of the second verification operation.

An exemplary embodiment of the invention further provides a memory control circuit unit configured to control a rewritable non-volatile memory module, and the memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface. The memory management circuit is configured to: read first data, signature information, and first verification information from the rewritable non-volatile memory module; perform a first verification operation according to the signature information and the first verification information; generate second verification information according to the first data; perform a second verification operation according to the first verification information and the second verification information; and perform a corresponding process on the first data according to an operation result of the first verification operation and an operation result of the second verification operation.

An exemplary embodiment of the invention further provides a memory storage device including a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The rewritable non-volatile memory module stores first data, signature information, and first verification information. The signature information includes a digital signature corresponding to the first data, and the first verification information is generated by performing a hash operation on the first data.

Based on the above, the first data, the signature information, and the first verification information may be read from the memory storage device or the rewritable non-volatile memory module. According to the read signature information and the first verification information, the first verification operation may be performed. Moreover, the second verification information may be generated according to the first data, and the second verification operation may be performed according to the read first verification information and the dynamically generated second verification information. Then, the corresponding process may be performed on the first data according to the operation results of the first verification operation and the second verification operation. Therefore, by performing the first verification operation in advance, the verification efficiency of the signature may be improved.

DESCRIPTION OF THE EMBODIMENTS

In general, a memory storage device (also referred to as a memory storage system) includes a rewritable non-volatile memory module and a controller (also referred to as a control circuit). The memory storage device may be used with a host system, such that the host system may write data into the memory storage device or read data from the memory storage device.

Figure 1:
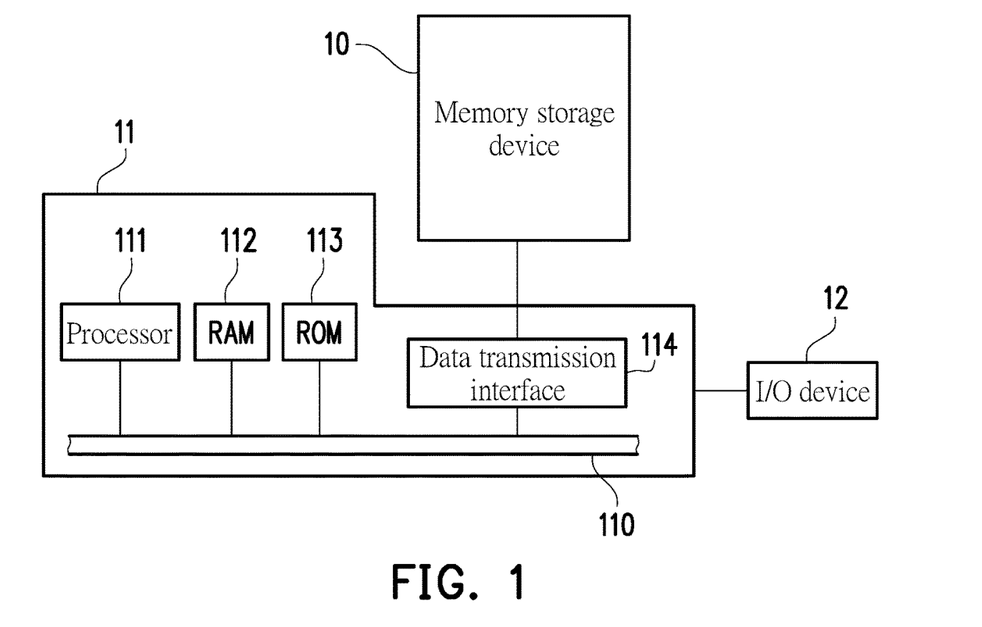
FIG. 1 is a schematic diagram of a host system, a memory storage device, and an input/output (I/O) device shown according to an exemplary embodiment of the invention.
Figure 2:
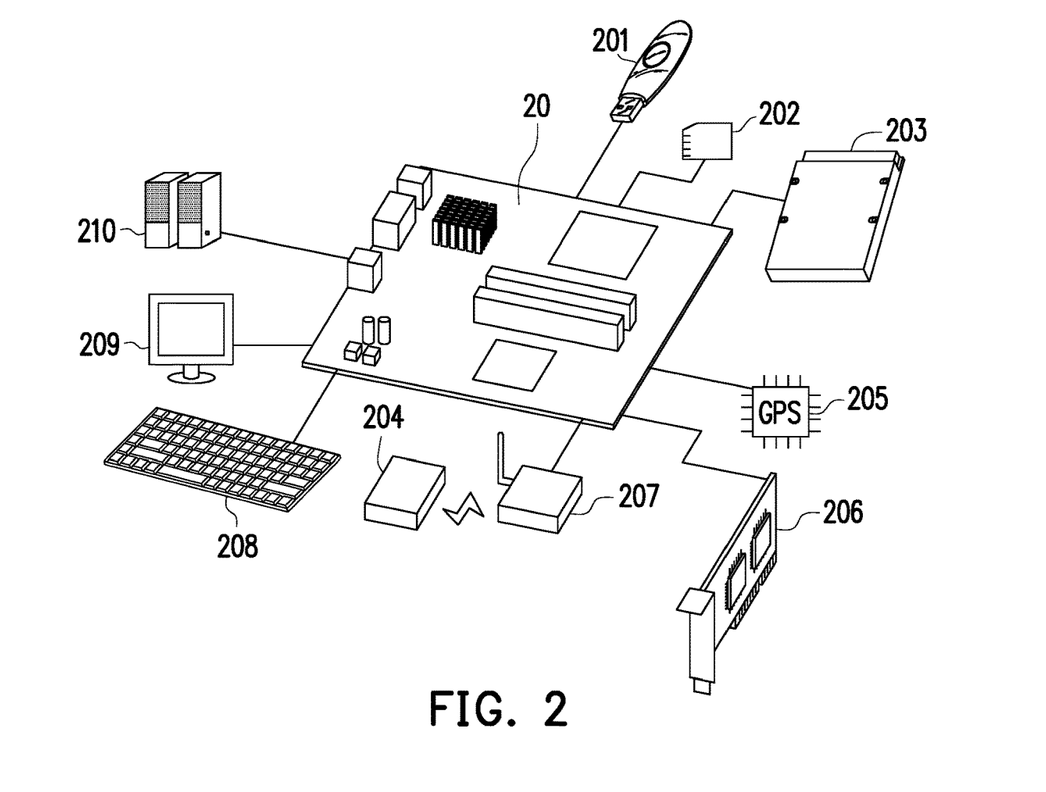
FIG. 2 is a schematic diagram of a host system, a memory storage device, and an I/O device shown according to an exemplary embodiment of the invention.

FIG. 1 is a schematic diagram of a host system, a memory storage device, and an input/output (I/O) device shown according to an exemplary embodiment of the invention. FIG. 2 is a schematic diagram of a host system, a memory storage device, and an I/O device shown according to an exemplary embodiment of the invention.

Referring to FIG. 1 and FIG. 2, a host system 11 may include a processor 111, a random-access memory (RAM) 112, a read-only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to the memory storage device 10 via the data transmission interface 114. For example, the host system 11 may store data into the memory storage device 10 or read data from the memory storage device 10 via the data transmission interface 114. Moreover, the host system 11 may be coupled to the I/O device 12 via the system bus 110. For example, the host system 11 may send an output signal to the I/O device 12 or receive an input signal from the I/O device 12 via the system bus 110.

In an exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114.

In an exemplary embodiment, the memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

In an exemplary embodiment, the host system 11 is a computer system. In an exemplary embodiment, the host system 11 may be any system that may substantially store data with the memory storage device. In an exemplary embodiment, the memory storage device 10 and the host system 11 may respectively include a memory storage device 30 and a host system 31 of FIG. 3.

Figure 3:
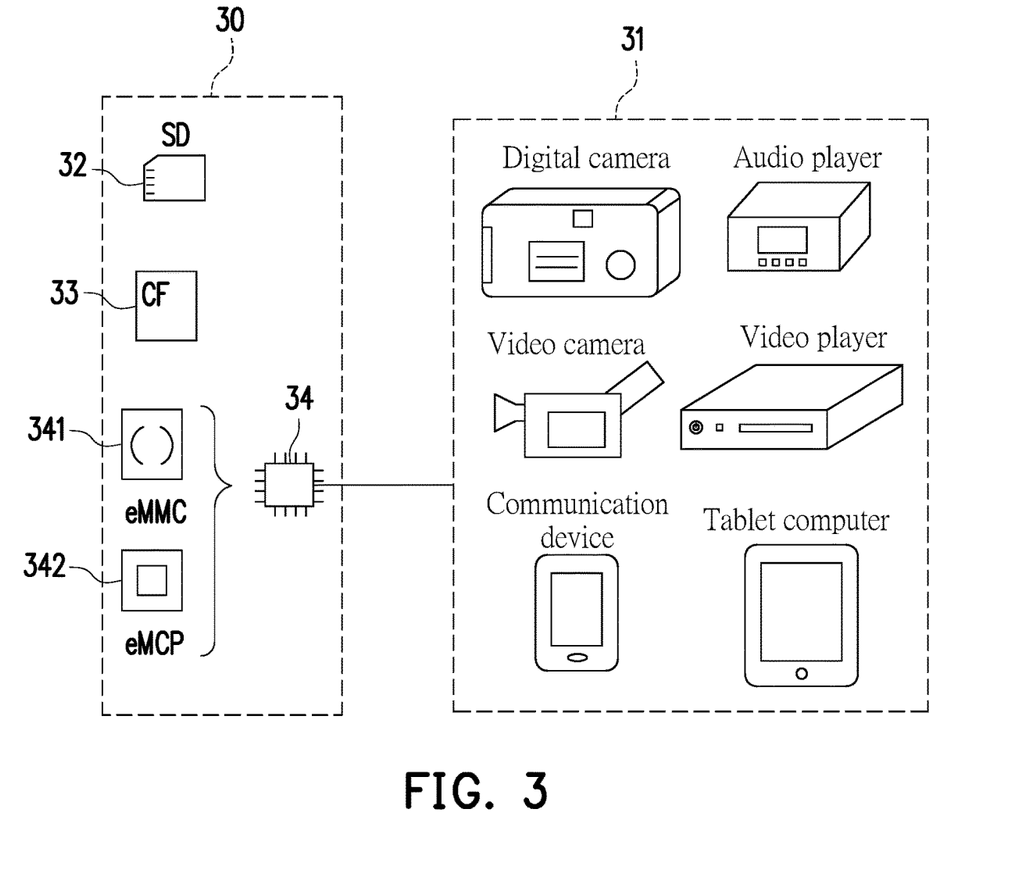
FIG. 3 is a schematic of a host system and a memory storage device shown according to an exemplary embodiment of the invention.

FIG. 3 is a schematic of a host system and a memory storage device shown according to an exemplary embodiment of the invention. Referring to FIG. 3, the memory storage device 30 may be used in conjunction with the host system 31 to store data. For example, the host system 31 may be a system such as a digital camera, a video camera, a communication device, an audio player, a video player, or a tablet computer. For example, the memory storage device 30 may be various non-volatile memory storage devices such as a Secure Digital (SD) card 32, a Compact Flash (CF) card 33, or an embedded storage device 34 used by the host system 31. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
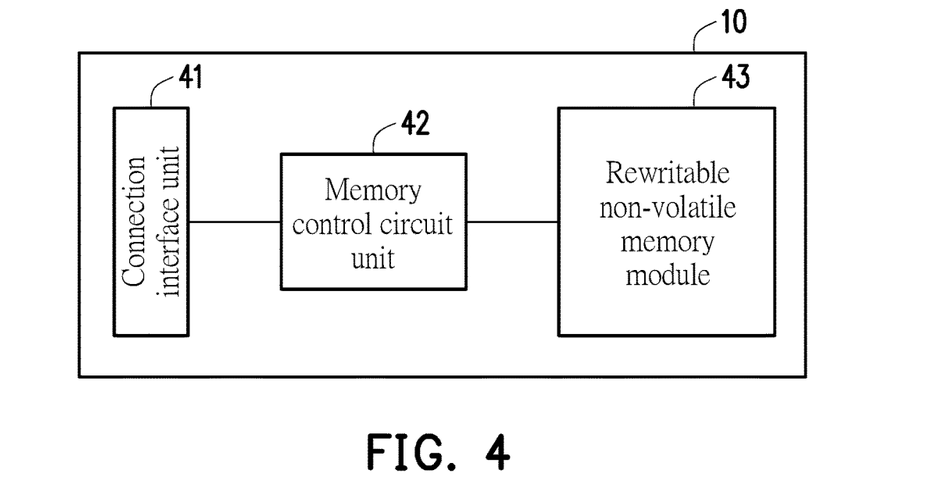
FIG. 4 is a schematic diagram of a memory storage device shown according to an exemplary embodiment of the invention.

FIG. 4 is a schematic diagram of a memory storage device shown according to an exemplary embodiment of the invention. Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may communicate with the host system 11 via the connection interface unit 41. In an exemplary embodiment, the connection interface unit 41 is compatible with the Peripheral Component Interconnect Express (PCI Express) standard. In an exemplary embodiment, the connection interface unit 41 may also conform to the Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 41 may be sealed in a chip with the memory control circuit unit 42. Alternatively, the connection interface unit 41 is disposed outside of a chip containing the memory control circuit unit 42.

The memory control circuit unit 42 is coupled to the connection interface unit 41 and the rewritable non-volatile memory module 43. The memory control circuit unit 42 is configured to perform a plurality of logic gates or control commands implemented in a hardware form or in a firmware form. The memory control circuit unit 42 also performs operations such as writing, reading, and erasing data in the rewritable non-volatile memory storage module 43 according to the commands of the host system 11.

The rewritable non-volatile memory module 43 is configured to store the data written by the host system 11. The rewritable non-volatile memory module 43 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 43 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 43 has a plurality of storage states. Which storage state one memory cell belongs to may be determined via the application of a read voltage, so as to obtain one or a plurality of bits stored by the memory cell.

In an exemplary embodiment, the memory cells of the rewritable non-volatile memory module 43 may form a plurality of physical programming units, and these physical programming units may form a plurality of physical erasing units. Specifically, the memory cells on the same word line may form one or a plurality of physical programming units. If each of the memory cells may store two or more bits, the physical programming units on the same word line may at least be classified into lower physical programming units and upper physical programming units. For example, the least significant bit (LSB) of a memory cell belongs to the lower physical programming unit, and the most significant bit (MSB) of a memory cell belongs to the upper physical programming unit. Generally, in an MLC NAND-type flash memory, the write speed of the lower physical programming unit is greater than the write speed of the upper physical programming unit, and/or the reliability of the lower physical programming unit is greater than the reliability of the upper physical programming unit.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundancy bit area. The data bit area contains a plurality of physical sectors configured to store user data, and the redundancy bit area is configured to store system data (for example, management data such as an ECC). In an exemplary embodiment, the data bit area contains 32 physical sectors, and the size of one physical sector is 512 bytes (B). However, in other exemplary embodiments, the data bit area may also contain 8, 16, or a greater or lesser number of physical sectors, and the size of each of the physical sectors may also be greater or smaller. Moreover, the physical erasing unit is the smallest unit of erasing. That is, each of the physical erase units contains the smallest number of memory cells erased together. For example, the physical erasing unit is a physical block.

Figure 5:
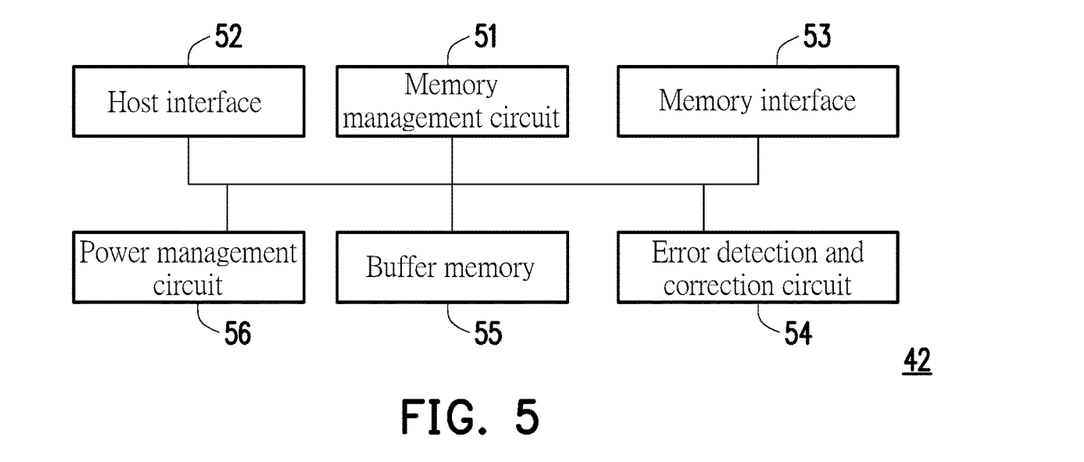
FIG. 5 is a schematic diagram of a memory control circuit unit shown according to an exemplary embodiment of the invention.

FIG. 5 is a schematic diagram of a memory control circuit unit shown according to an exemplary embodiment of the invention. Referring to FIG. 5, the memory control circuit unit 42 includes a memory management circuit 51, a host interface 52, and a memory interface 53.

The memory management circuit 51 is configured to control the overall operation of the memory control circuit unit 42. Specifically, the memory management circuit 51 has a plurality of control commands. During the operation of the memory storage device 10, the control commands are executed to perform operations such as writing, reading, and erasing data. In the following, descriptions relating to the operation of the memory management circuit 51 are equivalent to the descriptions of the operation of the memory control circuit unit 42.

In an exemplary embodiment, the control commands of the memory management circuit 51 are implemented in firmware form. For example, the memory management circuit 51 has a microprocessor unit (not shown) and a read-only memory (not shown), and the control commands are burned into the ROM. During the operation of the memory storage device 10, the control commands are executed by the microprocessor unit to perform operations such as writing, reading, and erasing data.

In an exemplary embodiment, the control commands of the memory management circuit 51 may also be stored in the form of program codes in a specific area (for example, the system area in a memory module exclusively configured to store system data) of the rewritable non-volatile memory module 43. Moreover, the memory management circuit 51 has a microprocessor unit (not shown), a ROM (not shown), and a RAM (not shown). In particular, the ROM has a boot code, and when the memory control circuit unit 42 is enabled, the microprocessor unit first executes the boot code to load the control commands stored in the rewritable non-volatile memory module 43 into the RAM of the memory management circuit 51. Next, the microprocessor unit runs the control commands to perform operations such as writing, reading, and erasing data.

In an exemplary embodiment, the control commands of the memory management circuit 51 may also be implemented in hardware form. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 43. The memory write circuit is configured to issue a write command sequence to the rewritable non-volatile memory module 43 to write data into the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process data to be written into the rewritable non-volatile memory module 43 and data read from the rewritable non-volatile memory module 43. The write command sequence, the read command sequence, and the erase command sequence may independently include one or a plurality of program codes or command codes and be configured to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct the performance of corresponding operations.

The host interface 52 is coupled to the memory management circuit 51. The memory management circuit 51 may communicate with the host system 11 via the host interface 52. The host interface 52 may be used to receive and identify commands and data sent by the host system 11. For example, the commands and data sent by the host system 11 may be sent to the memory management circuit 51 via the host interface 52. In addition, the memory management circuit 51 may send data to the host system 11 via the host interface 52. In the present exemplary embodiment, the host interface 52 is compatible with the PCI Express standard. However, it should be understood that the invention is not limited thereto, and the host interface 52 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard, or other suitable standards for data transmission.

The memory interface 53 is coupled to the memory management circuit 51 and configured to access the rewritable non-volatile memory module 43. For example, the memory management circuit 51 may access the rewritable non-volatile memory module 43 via the memory interface 53. In other words, data to be written into the rewritable non-volatile memory module 43 is converted to a format acceptable to the rewritable non-volatile memory module 43 via the memory interface 53. Specifically, if the memory management circuit 51 is to access the rewritable non-volatile memory module 43, the memory interface 53 sends a corresponding command sequence. For example, the command sequences may include a write command sequence instructing data writing, a read command sequence instructing data reading, an erase command sequence instructing data erasing, and corresponding command sequences configured to instruct various memory operations (such as changing read voltage level or performing a garbage collection operation). The command sequences are generated by, for example, the memory management circuit 51 and sent to the rewritable non-volatile memory module 43 via the memory interface 53. The command sequences may include one or a plurality of signals or data on a bus. The signals or data may include a command code or a program code. For example, when reading a command sequence, information such as read identification code or memory address is included.

In an exemplary embodiment, the memory control circuit unit 42 further includes an error detection and correction circuit 54, a buffer memory 55, and a power management circuit 56.

The error detection and correction circuit 54 is coupled to the memory management circuit 51 and configured to execute an error detection and correction operation to ensure the correctness of data. Specifically, when the memory management circuit 51 receives a write command from the host system 11, the error detection and correction circuit 54 generates a corresponding error correction code (ECC) and/or an error detection code (EDC) for data corresponding to the write command, and the memory management circuit 51 writes the data corresponding to the write command and the corresponding ECC and/or EDC into the rewritable non-volatile memory module 43. Next, when data is read from the rewritable non-volatile memory module 43, the memory management circuit 51 reads the ECC and/or the EDC corresponding to the data at the same time, and the error detection and correction circuit 54 executes an error detection and correction operation on the read data based on the ECC and/or the EDC.

The buffer memory 55 is coupled to the memory management circuit 51 and configured to temporarily store data. The power management circuit 56 is coupled to the memory management circuit 51 and configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
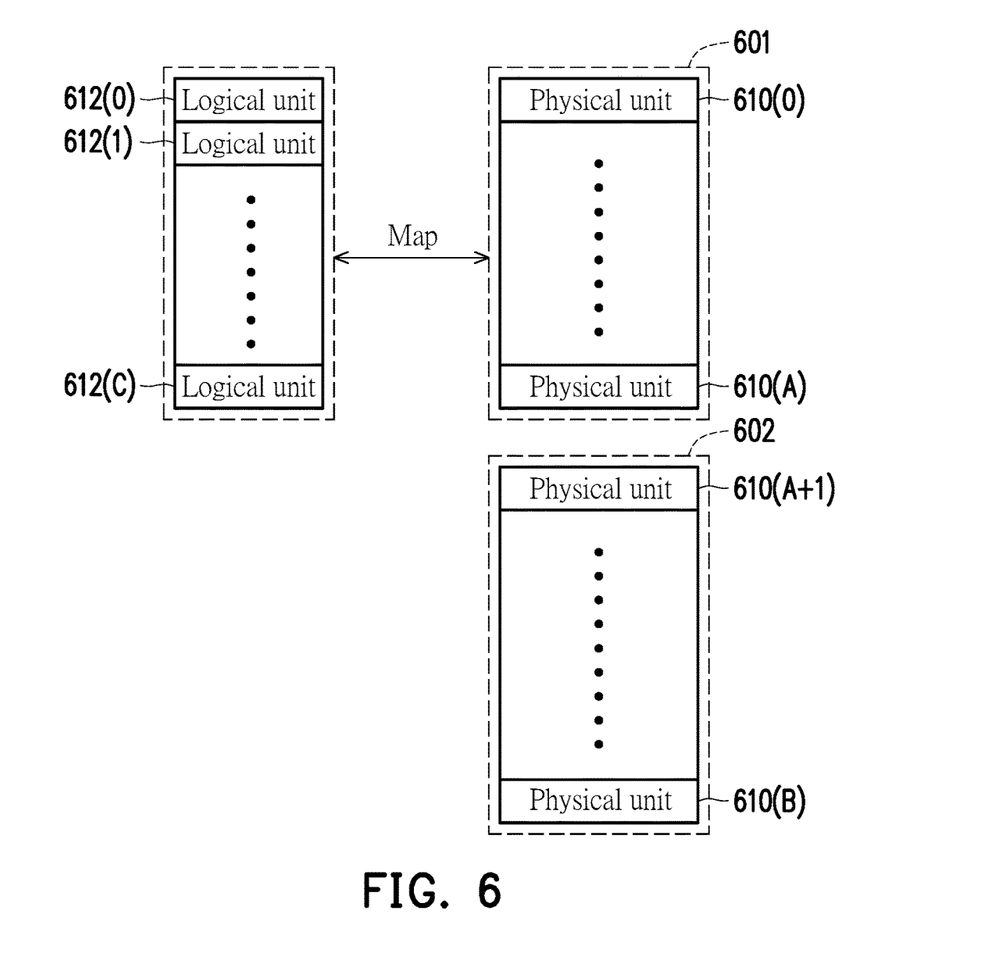
FIG. 6 is a schematic diagram of the management of a rewritable non-volatile memory module shown according to an exemplary embodiment of the invention.

FIG. 6 is a schematic diagram of the management of a rewritable non-volatile memory module shown according to an exemplary embodiment of the invention. Referring to FIG. 6, the memory management circuit 51 may logically group physical units 610(0) to 610(B) in the rewritable non-volatile memory module 43 into a storage area 601 and a spare area 602.

In an exemplary embodiment, one physical unit refers to one physical address or one physical programming unit. In an exemplary embodiment, one physical unit may also be formed by a plurality of continuous or discontinuous physical addresses. In an exemplary embodiment, one physical unit may also refer to one virtual block (VB). One virtual block may include a plurality of physical addresses or a plurality of physical programming units.

Physical units 610(0) to 610(A) in the storage area 601 are configured to store user data (for example, user data from the host system 11 in FIG. 1). For example, the physical units 610(0) to 610(A) in the storage area 601 may store valid data and invalid data. Physical units 610(A+1) to 610(B) in the spare area 602 do not store data (for example, valid data). For example, if a certain physical unit does not store valid data, this physical unit may be associated (or added) to the spare area 602. In addition, the physical units in the spare area 602 (or physical units that do not store valid data) may be erased. When writing new data, one or a plurality of physical units may be extracted from the spare area 602 to store the new data. In an exemplary embodiment, the spare area 602 is also referred to as a free pool.

The memory management circuit 51 may configure logical units 612(0) to 612(C) to map the physical units 610(0) to 610(A) in the storage area 601. In an exemplary embodiment, each of the logical units corresponds to one logical address. For example, one logical address may include one or a plurality of logical block addresses (LBAs) or other logical management units. In an exemplary embodiment, one logical unit may also correspond to one logical programming unit or formed by a plurality of continuous or discontinuous logical addresses.

It should be mentioned that, one logical unit may be mapped to one or a plurality of physical units. If a certain physical unit is currently mapped by a certain logical unit, the data currently stored in this physical unit include valid data. On the other hand, if a certain physical unit is not currently mapped by any logical unit, the data currently stored in this physical unit is invalid data.

The memory management circuit 51 may record the management data describing the mapping relationship between logical units and physical units (also called logical-to-physical or logical address to physical address (L2P) mapping information) in at least one logical-to-physical mapping table. When the host system 11 is to read data from the memory storage device 10 or write data to the memory storage device 10, the memory management circuit 51 may access the rewritable non-volatile memory module 43 according to the information in the logical-to-physical mapping table.

Figure 7:
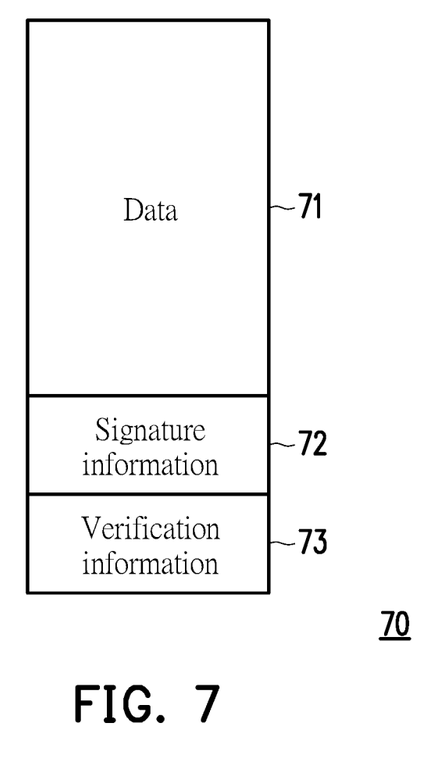
FIG. 7 is a schematic diagram of a data structure simultaneously storing signature information and verification information shown according to an exemplary embodiment of the invention.

FIG. 7 is a schematic diagram of a data structure simultaneously storing signature information and verification information shown according to an exemplary embodiment of the invention. Referring to FIG. 7, a data structure 70 includes data (also referred to as first data) 71, signature information 72, and verification information (also referred to as first verification information) 73. The data structure 70 may be stored in one or a plurality of physical units in FIG. 6.

In an exemplary embodiment, the memory management circuit 51 may store the data 71, the signature information 72, and the verification information 73 in the rewritable non-volatile memory module 43 in the form of the data structure 70. The data 71 may include a program code, a firmware code, or any data. The signature information 72 includes a digital signature corresponding to the data 71. The verification information 73 may be generated by performing a hash operation on the data 71. For example, the hash operation may adopt a secure hash algorithm (SHA) or other types of hash algorithms, which are not limited in the invention. In particular, the verification information 73 may be configured to verify the signature information 72 when the data 71 is read from the rewritable non-volatile memory module 43.

In an exemplary embodiment, when the data 71 is to be stored, the memory management circuit 51 may perform the hash operation on the data 71 to generate the verification information 73. In other words, the verification information 73 may reflect the operation result of performing the hash operation on the data 71. After the verification information 73 is obtained, the memory management circuit 51 may store the verification information 73 in the rewritable non-volatile memory module 43 as a portion of the data structure 70.

Moreover, after the verification information 73 is obtained, the memory management circuit 51 may generate the signature information 72 according to the verification information 73 and key information (also referred to as first key information). For example, the first key information may include a private key in public-key cryptography or asymmetric cryptography. The memory management circuit 51 may perform an operation on the verification information 73 and the first key information according to the elliptic curve encryption algorithm in public key cryptography or asymmetric cryptography or a similar asymmetric encryption algorithm to generate the signature information 72. In this way, the concept of the use of the signature information 72 is similar to that of the owner of the data 71 using his private key to sign the data 71 by hand. It should be noted that the use of various asymmetric encryption algorithms such as the elliptic curve encryption algorithm to generate digital signatures is prior art, and is therefore not repeated herein. After the signature information 72 is obtained, the memory management circuit 51 may store the signature information 72 in the rewritable non-volatile memory module 43 as a portion of the data structure 70.

Conventionally, when the data 71 is to be stored, the data 71 may be stored together with the signature information 72, but the verification information 73 is not stored in advance. That is, the conventional data structure 70 does not contain the verification information 73. Conventionally, when the data 71 is to be read, the verification information 73 is obtained according to the real-time operation result of the hash operation performed on the data 71 during the process of reading the data 71. After the verification information 73 is obtained, the verification operation of the asymmetric encryption algorithm may be performed according to the signature information 72 and the verification information 73 to verify the signature information 72. In other words, traditionally, when the data 71 is read, the verification operation of the asymmetric encryption algorithm needs to wait until the hash operation performed on the data 71 is completed (i.e., the verification information 73 is obtained from calculation), and therefore the execution time of the signature verification is very long.

However, in the exemplary embodiment of FIG. 7, when the data 71 in the data structure 70 is to be read, the signature information 72 and the verification information 73 in the data structure 70 may be directly used in the verification operation of the asymmetric encryption algorithm, so that the verification of the signature information 72 may be performed at least partially in synchronization with the hash operation of the data 71. Then, the real-time operation result of the hash operation of the data 71 is used to verify the validity of the verification information 73. Thereby, the time for executing the signature verification may be effectively shortened and/or the verification efficiency of the signature may be improved.

Figure 8:
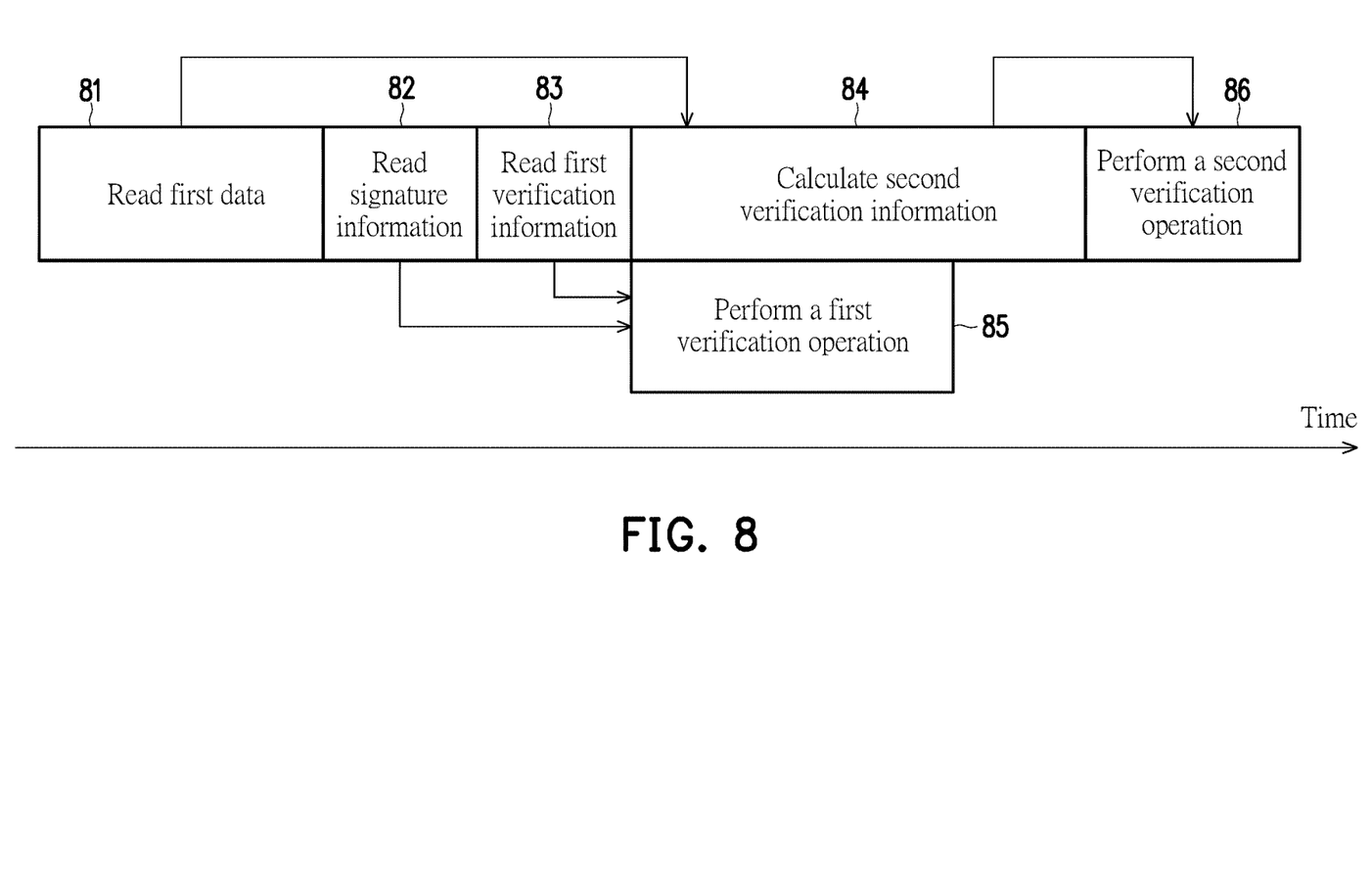
FIG. 8 is a schematic diagram of reading data and performing signature verification shown according to an exemplary embodiment of the invention.

FIG. 8 is a schematic diagram of reading data and performing signature verification shown according to an exemplary embodiment of the invention. It should be noted that, in FIG. 8, the direction of the horizontal axis represents time.

Referring to FIG. 7 and FIG. 8, in an exemplary embodiment, when the data 71 (i.e., the first data) is to be read, in blocks 81 to 83, the memory management circuit 51 may sequentially read the data 71, the signature information 72, and the verification information 73 (i.e., the first verification information) from the rewritable non-volatile memory module 43.

After the data 71 is read, in block 84, the memory management circuit 51 may generate another verification information (also referred to as second verification information) according to the read data 71. For example, the memory management circuit 51 may perform the hash operation on the first data to generate the second verification information. In other words, the second verification information may reflect the operation result of performing the hash operation on the data 71.

Moreover, after the signature information 72 and verification information 73 are read, in block 85, the memory management circuit 51 may perform one verification operation (also referred to as a first verification operation) according to the read signature information 72 and verification information 73. For example, the signature information 72 and the verification information 73 may be sent to a signature verification module operated by the memory management circuit 51. The signature verification module may perform the first verification operation according to the signature information 72 and the verification information 73. For example, the signature verification module may adopt the elliptic curve digital signature algorithm (ECDSA) in public key cryptography or asymmetric cryptography or a similar digital signature algorithm to verify the signature information 72 according to the verification information 73. In an exemplary embodiment, the first verification operation is also referred to as a signature verification operation. This signature verification operation may be used to verify the signature information 72 (i.e., digital signature).

In an exemplary embodiment, in block 85, the memory management circuit 51 (or the signature verification module) may perform the first verification operation according to another key information (also referred to as second key information), the signature information 72, and the verification information 73. For example, the second key information may include a public key in public key cryptography or asymmetric cryptography, and the public key and the private key previously used to generate the signature information 72 correspond to each other (e.g., match each other). For example, the memory management circuit 51 (or the signature verification module) may perform an operation on the second key information, the signature information 72, and the verification information 73 according to ECDSA to obtain the operation result of the first verification operation. It should be noted that the use of various signature verification algorithms such as ECDSA to verify the digital signature is prior art, and is therefore not repeated herein.

In an exemplary embodiment, if the operation result of the first verification operation is positive, the read signature information 72 passed the verification of the signature verification module. In contrast, if the operation result of the first verification operation is negative, the read signature information 72 does not pass the verification of the signature verification module. If the signature information 72 does not pass the verification of the signature verification module, the signature information 72 may be forged or tampered with, and the correctness or security of the data 71 may also be in doubt.

It should be mentioned that, as shown in FIG. 8, the time point at which the first verification operation is performed and the time point at which the second verification information is generated according to the first data may at least be partially overlapped with each other. Thereby, the overall time of performing signature verification may be effectively shortened and/or the verification efficiency of the signature may be improved.

Moreover, after the dynamically generated second verification information is obtained, in block 86, the memory management circuit 51 may perform another verification operation (also referred to as second verification operation) related to the data 71 according to the verification information 73 read from the rewritable non-volatile memory module 43 and the second verification information. For example, in the second verification operation, the memory management circuit 51 may compare the second verification information with the verification information 73 read from the rewritable non-volatile memory module 43.

In an exemplary embodiment, if the comparison result between the second verification information and the verification information 73 indicates that the second verification information is the same as the verification information 73, the memory management circuit 51 may determine that the operation result of the second verification operation is positive. In contrast, if the comparison result between the second verification information and the verification information 73 indicates that the second verification information is different from the verification information 73, the memory management circuit 51 may determine that the operation result of the second verification operation is negative. In other words, the comparison result between the second verification information and the verification information 73 (i.e., the operation result of the second verification operation) may reflect whether the second verification information is the same as the previously stored verification information 73.

In an exemplary embodiment, if the operation result of the second verification operation is positive, the second verification information is the same as the verification information 73. Therefore, the memory management circuit 51 may determine that the first verification operation performed based on the verification information 73 is valid. In contrast, if the operation result of the second verification operation is negative, the second verification information is different from the verification information 73. Therefore, the memory management circuit 51 may determine that the first verification operation performed based on the verification information 73 is invalid.

After the first verification operation and the second verification operation are completed, the memory management circuit 51 may perform corresponding processing on the read data 71 according to the operation results of the first verification operation and the second verification operation. For example, if the operation results of the first verification operation and the second verification operation are both positive, the signature information 72 is verified by the signature verification module and the first verification operation performed based on the verification information 73 is valid. Therefore, the memory management circuit 51 may continue to perform the preset operation corresponding to the data 71. For example, if the data 71 is the data to be read by the host system 11, the memory management circuit 51 may transmit the data 71 to the host system 11. Alternatively, if the data 71 is the firmware code executed when the memory storage device 10 is powered on, the memory management circuit 51 may continue to execute the data 71 to execute the boot process.

In an exemplary embodiment, if the operation result of the first verification operation is positive, but the operation result of the second verification operation is negative, although the signature information 72 is verified by the signature verification module, the verification information 73 does not represent the verification information (i.e., the second verification information) actually to be used. Therefore, the memory management circuit 51 may execute a preset error handling procedure. For example, the error handling procedure may include sending an error message to the host system 11 to reflect an issue with the digital signature corresponding to the data 71.

In an exemplary embodiment, if the operation result of the first verification operation is negative, but the operation result of the second verification operation is positive, although the first verification operation performed based on the verification information 73 is valid (i.e., the operation result of the second verification operation is positive), the signature information 72 does not pass the verification of the signature verification module (i.e., the operation result of the first verification operation is negative). Therefore, the memory management circuit 51 may also execute a preset error handling procedure. Similarly, if the operation results of the first verification operation and the second verification operation are both negative, the memory management circuit 51 may also execute a preset error handling procedure.

In an exemplary embodiment, if the operation result of the first verification operation and/or the operation result of the second verification operation is negative, the memory management circuit 51 may use the currently calculated second verification information to replace the verification information 73 previously input to the signature verification module to perform the signature verification operation again. By using the second verification information to re-verify the signature information 72, the accuracy of the signature verification operation may be ensured.

It should be mentioned that, in the exemplary embodiment of FIG. 8, the calculation of the second verification information and the first verification operation are started only after the data 71, the signature information 72, and the verification information 73 are continuously read from the rewritable non-volatile memory module 43. However, in another exemplary embodiment, the calculation of the first verification operation and/or the second verification information may also be performed synchronously with the reading of the data 71, so as to further improve the verification efficiency of the data and the signature.

Figure 9:
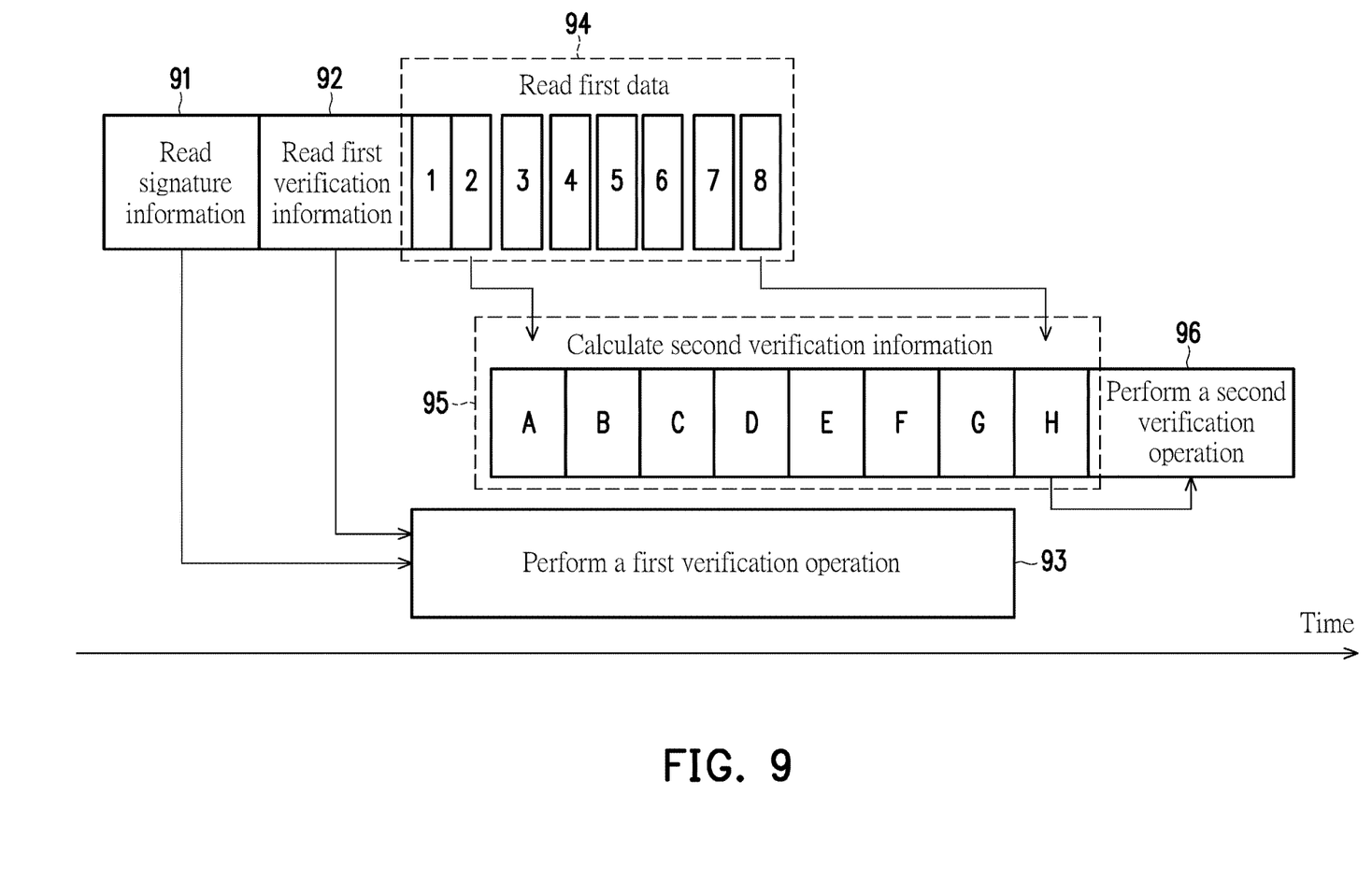
FIG. 9 is a schematic diagram of reading data and performing signature verification shown according to an exemplary embodiment of the invention.

FIG. 9 is a schematic diagram of reading data and performing signature verification shown according to an exemplary embodiment of the invention. In FIG. 9, the direction of the horizontal axis also represents time.

Referring to FIG. 7 and FIG. 9, in an exemplary embodiment, when the data 71 (i.e., the first data) is to be read, in blocks 91 and 92, the memory management circuit 51 may first read the signature information 72 and the verification information 73 (i.e., the first verification information) from the rewritable non-volatile memory module 43. Then, in block 93, the memory management circuit 51 may perform a first verification operation according to the read signature information 72 and verification information 73. For example, the signature information 72 and the verification information 73 may be sent to the signature verification module run by the memory management circuit 51 to perform the first verification operation on the signature information 72 and the verification information 73.

Moreover, after the signature information 72 and the verification information 73 are read, in block 94, the memory management circuit 51 may read the data 71 (i.e., the first data) from the rewritable non-volatile memory module 43. In block 95, according to the read data 71, the memory management circuit 51 may gradually generate the second verification information. For example, the data segments marked 1 to 8 in FIG. 9 may be used to represent a plurality of data segments in the first data, and the information segments marked A to H may be used to represent a plurality of information segments in the second verification information. The memory management circuit 51 may read the data segments 1 to 8 in the first data from the rewritable non-volatile memory module 43 one by one, and generate the information segments A to H in the second verification information one by one according to the read data segments.

It should be mentioned that, similar to the exemplary embodiment of FIG. 8, in the exemplary embodiment of FIG. 9, the time point at which the first verification operation is performed and the time point at which the second verification information is generated according to the first data may also at least be partially overlapped with each other. Thereby, the overall time of performing signature verification may be effectively shortened and/or the verification efficiency of the signature may be improved. In particular, compared with the exemplary embodiment of FIG. 8, in the exemplary embodiment of FIG. 9, the calculation of both the first verification operation and the second verification information is performed synchronously with the reading of the data 71, thereby further shortening the overall time of performing signature verification and/or improving the verification efficiency of the signature.

After the second verification information is obtained, in block 96, the memory management circuit 51 may perform the second verification operation according to the verification information 73 read from the rewritable non-volatile memory module 43 and the second verification information. Then, according to the operation results of the first verification operation and the second verification operation, the memory management circuit 51 may perform corresponding processing on the read data 71. It should be noted that the related operation details of the first verification operation, the calculation of the second verification information, and the second verification operation in the exemplary embodiment of FIG. 9 are all as provided in the exemplary embodiment of FIG. 8, and are not repeated herein.

Figure 10:
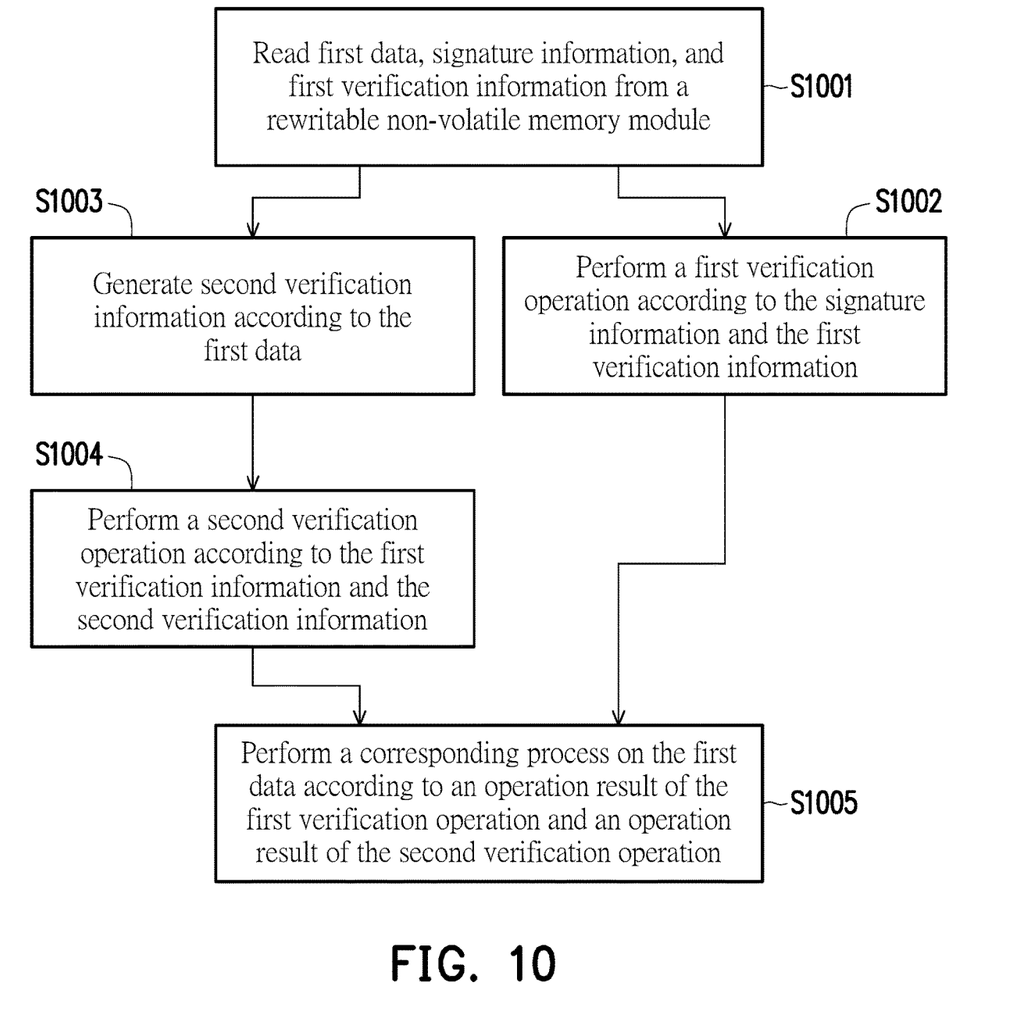
FIG. 10 is a flowchart of a signature verification method shown according to an exemplary embodiment of the invention.

FIG. 10 is a flowchart of a signature verification method shown according to an exemplary embodiment of the invention. Referring to FIG. 10, in step S1001, first data, signature information, and first verification information are read from a rewritable non-volatile memory module or a memory storage device. In step S1002, a first verification operation is performed according to the signature information and the first verification information. In step S1003, second verification information is generated according to the first data. In step S1004, a second verification operation is performed according to the first verification information and the second verification information. In step S1005, a corresponding process is performed on the first data according to an operation result of the first verification operation and an operation result of the second verification operation.

However, each step in FIG. 10 is as described in detail above, and is not repeated herein. It should be mentioned that, each step in FIG. 10 may be implemented as a plurality of program codes or circuits, and the invention is not limited thereto. Moreover, the method of FIG. 10 may be used with the above exemplary embodiments, and may also be used alone, and the invention is not limited thereto.

Based on the above, an exemplary embodiment provided by the invention may store the first verification information that may be configured to verify a digital signature in the rewritable non-volatile memory module or the memory storage device in advance. Then, when data is to be read, the pre-stored first verification information may be configured to perform the signature verification operation for the digital signature in advance (i.e., the first verification operation) without waiting for the generation of the second verification information. Thereby, the verification efficiency of the signature (i.e., the digital signature) may be effectively improved. In addition, by performing the second verification operation, the validity of the signature verification operation performed in advance may also be ensured.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A signature verification method, configured for a memory storage device, the signature verification method comprising:
    reading first data, signature information, and first verification information from the memory storage device;
    performing a first verification operation according to the signature information and the first verification information;
    generating second verification information according to the first data;
    performing a second verification operation according to the first verification information and the second verification information; and
    performing a corresponding process on the first data according to an operation result of the first verification operation and an operation result of the second verification operation.

2. The signature verification method of claim 1, wherein a time point at which the first verification operation is performed is overlapped with a time point at which the second verification information is generated according to the first data.

3. The signature verification method of claim 1, further comprising:
    generating the signature information according to the first verification information and first key information before the first data, the signature information, and the first verification information are read from the memory storage device; and
    storing the signature information in the memory storage device.

4. The signature verification method of claim 3, wherein the step of performing the first verification operation according to the signature information and the first verification information comprises:
    performing the first verification operation according to second key information, the signature information, and the first verification information to obtain the operation result of the first verification operation,
    wherein the first key information and the second key information match each other.

5. The signature verification method of claim 1, further comprising:
    performing a hash operation on the first data before the first data, the signature information, and the first verification information are read from the memory storage device to generate the first verification information; and
    storing the first verification information in the rewritable non-volatile memory module.

6. The signature verification method of claim 1, wherein performing the second verification operation according to the first verification information and the second verification information comprises:
    comparing the first verification information and the second verification information to obtain the operation result of the second verification operation.

7. The signature verification method of claim 1, wherein the step of reading the first data, the signature information, and the first verification information from the memory storage device comprises:
    reading the signature information and the first verification information from the memory storage device; and
    reading the first data from the memory storage device during the performance of the first verification operation according to the signature information and the first verification information.

8. A memory storage device, comprising:
    a connection interface unit configured to be coupled to a host system;
    a rewritable non-volatile memory module; and
    a memory control circuit unit coupled to the connection interface unit and the rewritable non-volatile memory module,
    wherein the memory control circuit unit is configured to:
        read first data, signature information, and first verification information from the rewritable non-volatile memory module;
        perform a first verification operation according to the signature information and the first verification information;
        generate second verification information according to the first data;
        perform a second verification operation according to the first verification information and the second verification information; and
        perform a corresponding process on the first data according to an operation result of the first verification operation and an operation result of the second verification operation.

9. The memory storage device of claim 8, wherein a time point at which the first verification operation is performed is overlapped with a time point at which the second verification information is generated according to the first data.

10. The memory storage device of claim 8, wherein the memory control circuit unit is further configured to:
    generate the signature information according to the first verification information and first key information before the first data, the signature information, and the first verification information are read from the rewritable non-volatile memory module; and
    store the signature information in the rewritable non-volatile memory module.

11. The memory storage device of claim 10, wherein performing the first verification operation according to the signature information and the first verification information comprises:
    performing the first verification operation according to second key information, the signature information, and the first verification information to obtain the operation result of the first verification operation,
    wherein the first key information and the second key information match each other.

12. The memory storage device of claim 8, wherein the memory control circuit unit is further configured to:
    perform a hash operation on the first data before the first data, the signature information, and the first verification information are read from the rewritable non-volatile memory module to generate the first verification information; and store the first verification information in the rewritable non-volatile memory module.

13. The memory storage device of claim 8, wherein performing the second verification operation according to the first verification information and the second verification information comprises:

comparing the first verification information and the second verification information to obtain the operation result of the second verification operation.

14. The memory storage device of claim 8, wherein the operation of reading the first data, the signature information, and the first verification information from the rewritable non-volatile memory module comprises:

reading the signature information and the first verification information from the rewritable non-volatile memory module; and reading the first data from the rewritable non-volatile memory module during the performance of the first verification operation according to the signature information and the first verification information.

15. A memory control circuit unit, configured to control a rewritable non-volatile memory module, the memory control circuit unit comprising:

a host interface configured to be coupled to a host system;

a memory interface configured to be coupled to the rewritable non-volatile memory module; and a memory management circuit coupled to the host interface and the memory interface, wherein the memory management circuit is configured to:
read first data, signature information, and first verification information from the rewritable non-volatile memory module;

perform a first verification operation according to the signature information and the first verification information;

generate second verification information according to the first data;

perform a second verification operation according to the first verification information and the second verification information; and perform a corresponding process on the first data according to an operation result of the first verification operation and an operation result of the second verification operation.

16. The memory control circuit unit of claim 15, wherein a time point at which the first verification operation is performed is overlapped with a time point at which the second verification information is generated according to the first data.

17. The memory control circuit unit of claim 15, wherein the memory management circuit is further configured to:

generate the signature information according to the first verification information and first key information before the first data, the signature information, and the first verification information are read from the rewritable non-volatile memory module; and store the signature information in the rewritable non-volatile memory module.

18. The memory control circuit unit of claim 17, wherein performing the first verification operation according to the signature information and the first verification information comprises:

performing the first verification operation according to second key information, the signature information, and the first verification information to obtain the operation result of the first verification operation, wherein the first key information and the second key information match each other.

19. The memory control circuit unit of claim 15, wherein the memory management circuit is further configured to:

perform a hash operation on the first data before the first data, the signature information, and the first verification information are read from the rewritable non-volatile memory module to generate the first verification information; and store the first verification information in the rewritable non-volatile memory module.

20. The memory control circuit unit of claim 15, wherein performing the second verification operation according to the first verification information and the second verification information comprises:

comparing the first verification information and the second verification information to obtain the operation result of the second verification operation.

21. The memory control circuit unit of claim 15, wherein the operation of reading the first data, the signature information, and the first verification information from the rewritable non-volatile memory module comprises:

reading the signature information and the first verification information from the rewritable non-volatile memory module; and reading the first data from the rewritable non-volatile memory module during the performance of the first verification operation according to the signature information and the first verification information.

22. A memory storage device, comprising:

a connection interface unit configured to be coupled to a host system;

a rewritable non-volatile memory module; and a memory control circuit unit coupled to the connection interface unit and the rewritable non-volatile memory module, wherein the rewritable non-volatile memory module stores first data, signature information, and first verification information, the signature information comprises a digital signature corresponding to the first data, and the first verification information is generated by performing a hash operation on the first data.

23. The memory storage device of claim 22, wherein the first verification information is configured to verify the signature information when the first data is read from the rewritable non-volatile memory module.

24. The memory storage device of claim 22, wherein the memory control circuit unit is configured to store the first data, the signature information, and the first verification information in the rewritable non-volatile memory module.

* * * * *